United States Patent [19]
Lefevre et al.

[11] Patent Number: 4,893,931
[45] Date of Patent: Jan. 16, 1990

[54] METHOD FOR THE DETECTION OF POLARIZATION COUPLINGS IN A BIREFRINGENT OPTICAL SYSTEM AND APPLICATION OF THIS METHOD TO THE ASSEMBLING OF THE COMPONENTS OF AN OPTICAL SYSTEM

[75] Inventors: Hervé Lefevre, Paris; Jean P. Bettini, Perthes; Serge Botti, Viroflay, all of France

[73] Assignee: Thomson-CSF, Paris, France

[21] Appl. No.: 166,492

[22] Filed: Mar. 10, 1988

[30] Foreign Application Priority Data

Mar. 13, 1987 [FR] France .................................. 87 03459

[51] Int. Cl.⁴ .................................................. G01B 9/02
[52] U.S. Cl. ................................... 356/351; 356/73.1; 356/345
[58] Field of Search ......................... 356/73.1, 345, 351

[56] References Cited

FOREIGN PATENT DOCUMENTS 0190922 8/1986 European Pat. Off. .

OTHER PUBLICATIONS

Shibata et al., "Polarization Mode Dispersion Measurement in Elliptical Core Single-Mode Fibers by a Spatial Technique", *IEEE J. Quant. Elec.*, vol. QE-18, No. 1, pp. 53-58, 1/82.
Patent Abstracts of Japan, vol. 9, No. 320 (P-413)[2043], 14 Dec. 1985; & JP-A-60 147 627 (Nippon Denshin Denwa Kosha) 03-08-1985.
Applied Optics, vol. 19, No. 9, ler mai 1980, pp. 1489-1492, Optical Society of America, New York, US; N. Shibata et al.: "Spatial Technique for Measuring Modal Delay Differences in a Dual-Mode Optical Fiber".

*Primary Examiner*—Davis L. Willis
*Assistant Examiner*—Matthew W. Koren
*Attorney, Agent, or Firm*—Oblon, Spivak, McClelland, Maier & Neustadt

[57] ABSTRACT

A method for the detection of localized polarization couplings in a birefringent guided optical system uses a polarizer, at 45° with respect to the axes of the optical system placed at its output, and followed by a Michelson type interferometer in which one of the optical paths has a variable length. When the length of an optical path undergoes variation, interference fringes appear on half of the energy emitted. The difference in the length of the optical paths when fringes of this type appear characterizes the position of a localized polarization coupling, and the contrast between the fringes measured for this difference in length characterizes the amplitude ratio between the primary wave and the coupled wave. The invention can be applied in particular, to the assembly of the components of a birefringent optical system.

8 Claims, 3 Drawing Sheets

FIG_1
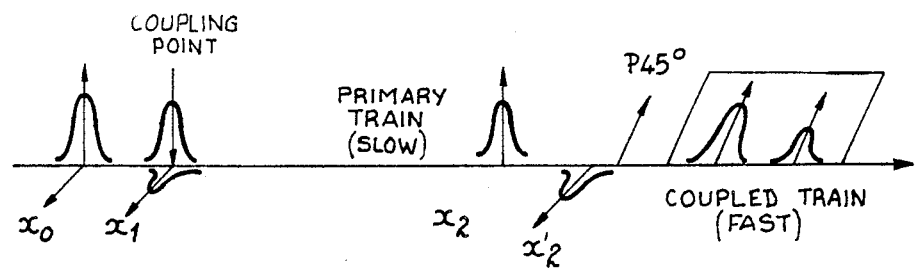
FIG_2
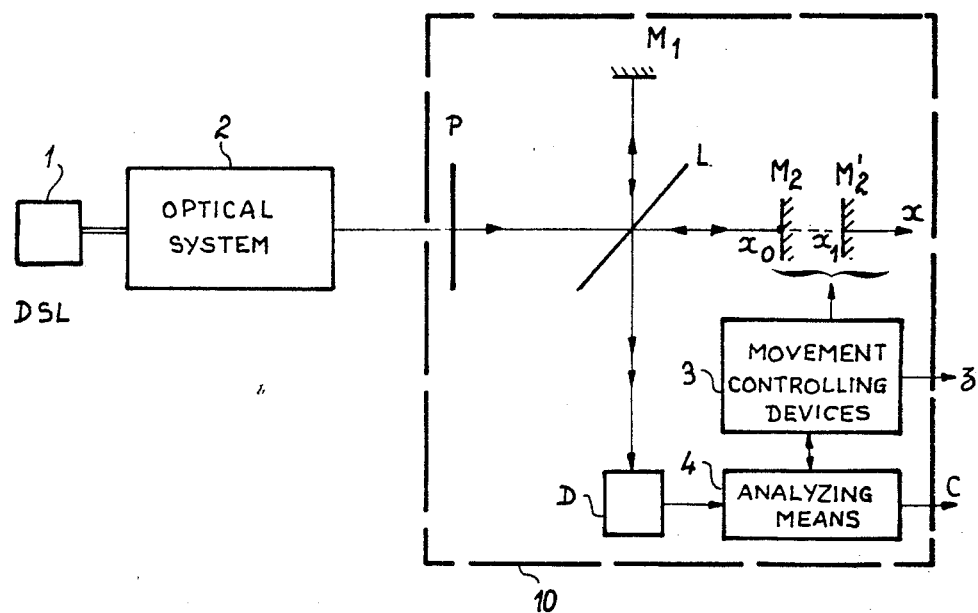

FIG_3
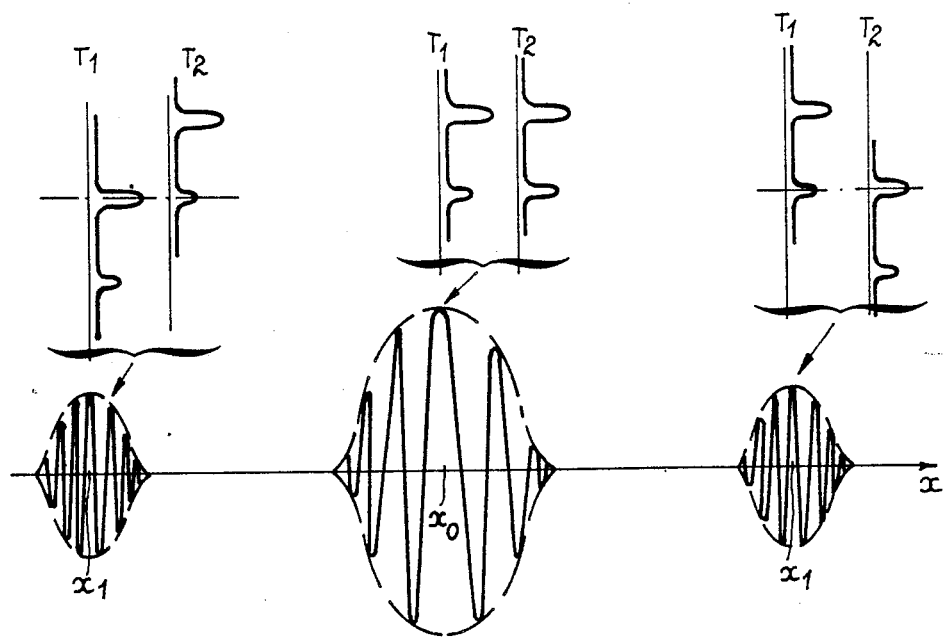
FIG_4
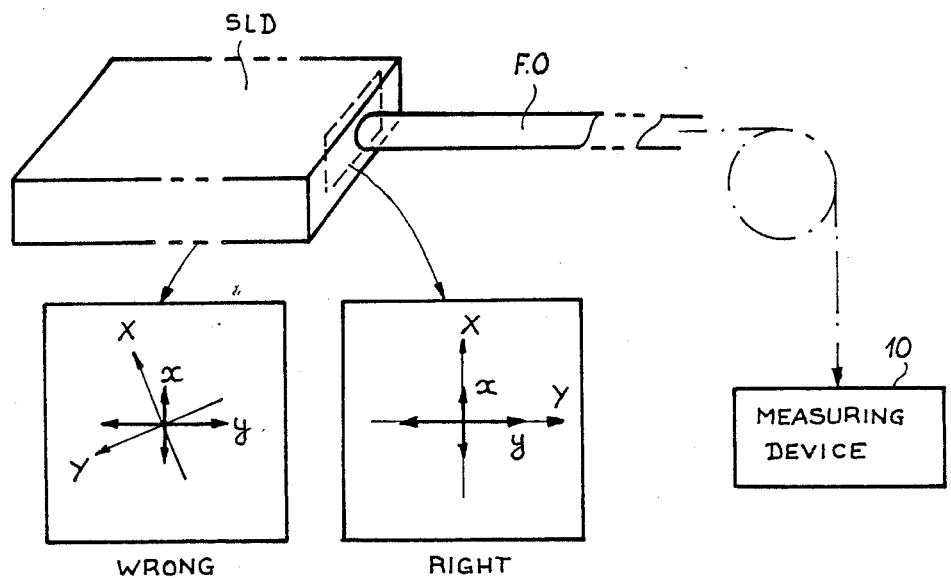

FIG_5
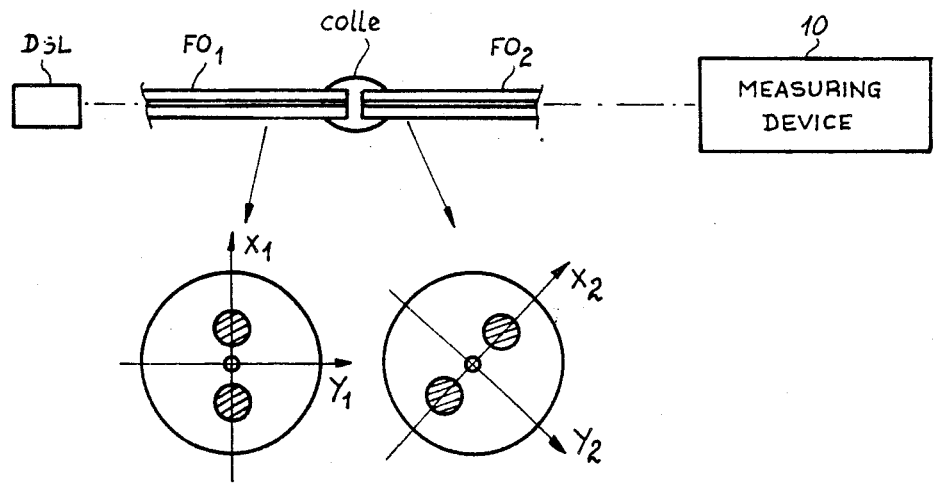
FIG_6
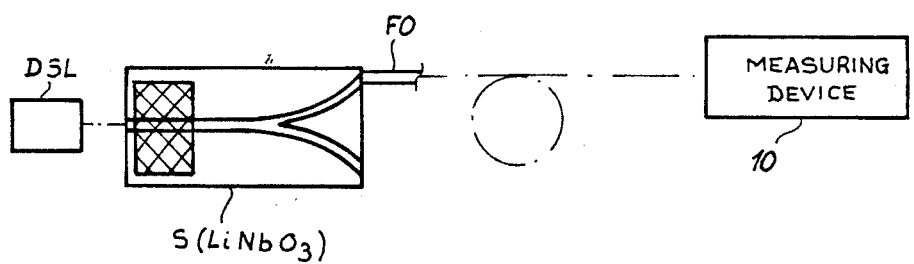

METHOD FOR THE DETECTION OF POLARIZATION COUPLINGS IN A BIREFRINGENT OPTICAL SYSTEM AND APPLICATION OF THIS METHOD TO THE ASSEMBLING OF THE COMPONENTS OF AN OPTICAL SYSTEM

BACKGROUND OF THE INVENTION

1. Field of the Invention

The invention relates to the field of optics and, more particularly, to a method for testing polarization couplings in a birefringent optical system and to the application of the said method to the assembling of components in integrated optical systems.

An integrated optical system mainly consists of a source and a succession of light-conducting elements, optic fibers, optic junctions, optic separators, modulators, etc. The connections between these various elements must be done with care, and precautions have to be taken to reduce unwanted couplings to the minimum.

2. Description of the Prior Art

Conventionally, when an optical system, for example, an optic fiber gyrometer, is studied, a number of characteristics can be measured. These are, for example, losses, rotation in polarization rotation due to faults or to applied strains, etc. But prior art methods cannot be used to locate the faults in the system or to measure them independently of one another.

SUMMARY OF THE INVENTION

An object of the invention is a method which can be used to locate and measure couplings in a birefringent optical system. This method can be applied, in particular, to the assembling of components in an optical system because it can be used for non-destructive measurement and for in situ checks, thus reducing couplings during assembly to the minimum.

The method according to the invention is a method for the detection of localized polarization couplings in a birefringent optical system, wherein these couplings are measured and located by a measuring device having a polarizer which is not aligned with the birefringence axes of the optical system (but is placed at 45° giving maximum sensitivity), an interferometer associated with interference analyzing devices and devices used to cause variations in the length of one of the optical paths in the interferometer; method wherein at least one wave train, polarized along a birefringence axis of the optical system, is emitted, each localized polarization coupling creating, from the primary wave train emitted, a coupled wave train along the other birefringence axis, said polarizer bringing these two wave trains along a common direction of polarization; method wherein the devices used to vary the length of an optical path in the interferometer are adjusted to detect interferences, relating to half the energy emitted, associated with a localized polarization coupling, the difference between the paths in the interferometer being directly characteristic of the position of the polarization coupling detected in the optical system, and the contrast between the fringes measured by the analyzing devices for this position being directly related to the intensity of the coupling located at this point.

BRIEF DESCRIPTION OF THE DRAWINGS

The invention will be better understood and other of its features will be seen from the following description made with reference to the appended figures, of which:

FIG. 1 shows the wave trains transmitted along an optical path when there is coupling;

FIG. 2 shows a schematic view of device for the measurement of polarization couplings, used in the detection method according to the invention;

FIG. 3 is an explanatory diagram;

FIG. 4 shows the method for aligning a source with a fiber;

FIG. 5 shows the method for aligning two fibers;

FIG. 6 shows an in situ test of an optic separator.

DESCRIPTION OF A PREFERRED EMBODIMENT

The couplings induced in a birefringent optical system may be caused by mechanical strains, by a modification in the structure of an all-fiber component of the coupler or derivator type for example, or by faults in the alignment of axes, for example, in a splice for the connection of two optic fibers, or by an interface between an optic fiber and an optic component on lithium niobate. The detection method according to the invention can be used to detect and measure these faults through a systemic, virtual exploration of the optic path. This method can be applied especially to the assembly of the components of a birefringent optical system, especially in order to align the birefringence axes at the transitions between the optical system components.

As a rule, in a birefringent optical system, for example a birefringent monomode optic fiber, associated with a light source, such as a superluminescent diode (SLD), coupled with the optical system so that the wave train coming from the source is propagated along one of the birefringence axes, the slow axis for example, if there is a particular strain or fault at a particular place in the fiber, the light partly goes along the other axis, namely the fast axis in the above example. From this fault, two wave trains will be propagated along the optical path, at different speeds depending on the two birefringence axes. At the output of the optical system, at the end of a certain distance, the wave trains are no longer overlapping. FIG. 1 shows this effect: the wave train is transmitted to the abscissa $x_o$, undergoes coupling at the abscissa $x_1$ and, when the primary (slow) train reaches the abscissa $x_2$, the coupled (fast) train is ahead and has reached the abscissa $x'_2$.

The measuring device used in the testing method of the invention applies an interferometer preceded by a polarizer at the output of the optical system so that the light follows two optical paths of different lengths which, owing to the lag between them, bring the wave trains, at least partially, back into temporal and spatial coincidence so as to create interferences. The contrast between the fringes and the difference in the paths are, as will be shown below, directly related to the level of the coupling that results from the fault and to the position of this fault in the optic system. This is the effect used in the testing method according to the invention.

This method can also be used to characterize a physical parameter which is variable along the optical path, for example, along a fiber, and which creates localized couplings: this parameter may be the pressure applied to the fiber.

The device shown in FIG. 2 includes a light source 1. This source is advantageously a superluminescent diode (SLD) which gives light, in a wide spectrum and coherent for a short length (of about 40 μm), i.e. it is far less coherent than the light given by a laser although it is slightly more coherent than white light. This light source provides light to a birefringent optical system 2, for example an optic fiber gyrometer. The measuring devices are chiefly a polarizer P at 45° with respect to the birefringence axes of the optical system. This polarizer is followed by an interferometer used to create interference between the waves transmitted along the two birefringence axes of the optical system. In the figure, the interferometer is a Michelson type interferometer having a semi-reflecting strip L and two mirrors, $M_1$ and $M_2$. These two mirrors, $M_1$ and $M_2$, respectively receive the light reflected and the light transmitted by the strip L. The said interferometer further has a detector B which simultaneously receives the light, reflected by the two mirrors, $M_1$ and $M_2$, and respectively transmitted and reflected by the separator S. The detector D is followed by devices 4 for analyzing the radiation received by the detector which measure the contrast between the detected fringes C. The device further comprises devices 3 to shift the mirror $M_2$. $M'_2$ is a second position of $M_2$.

The polarizer is placed at the output of the optical system, at about 45° with respect to the birefringence axes in order to maximize efficiency. This polarizer places the wave trains (the primary and coupled wave trains respectively) along the same polarization. At the output of the polarizer, the wave trains are not spatially overlapping because of their different propagation speeds. In the interferometer, which is then placed in the optical path, the movable mirror $M_2$ is then shifted and the interferences created are analyzed.

FIG. 3 shows the shape of the wave trains according to the shifting x of the interferometer mirror $M_2$: for the abscissa $x_o$, the two paths $T_1$ and $T_2$ in the interferometer are equal; the interferences relate to all the optical energy transmitted, the primary and coupled wave trains being in spatial and temporal coincidence; for two symmetrical abscissae $x_1$ and $x'_1$, where the primary wave train transmitted on one of the paths interferes with the coupled wave train transmitted on the other path, the interferences created relate to half the energy. The difference between the optical paths is $2(x_1-x_o)$.

Let $n_1$ and $n_2$ be the two refractive indices of the birefringent medium. If 1 is the distance between the coupling point and the output of the optical system before the polarizer P at 45°, the difference between the paths in the interferometer is related to the distance 1 by:

$$2(x_1-x_o)=(n_2-n_1)l$$

The difference in length between the optical paths in the interferometer is related to the lag between the primary wave train and the coupled wave train and, hence, to the path travelled in the birefringent optical medium from the coupling point onwards. The position of the coupling z is therefore directly related to the position of the shift of the interferometer mirror $M_2$. The contrast in the interference fringes is related to the amplitude ratio between the two waves and is therefore related to the coupling introduced at the abscissa z associated with the shifting of the mirror $M_2$. A contrast of $10^{-3}$, which can be easily measured, corresponds to a very low-level coupling of $-60$ dB ($10^{-6}$ in optical power).

The spatial resolution obtained, with a wide-spectrum, superluminescent diode as the source and a polarization-preserving monomode fiber as the birefringent medium, is typically 5 to 10 cm. In an integrated optical guide, using a lithium niobate $LiNbO_3$ substrate, the spatial resolution given by this system is 0.5 mm.

FIG. 4 shows the method for aligning a source with an optic fiber. The superluminescent diode SLD emits light coming from its output side. This light should be transmitted to a polarization-preserving optic fiber F.O. The light coming from this SLD is polarized along two axes x and y, and the birefringence axes of the optic fiber F.O. are X and Y. The measuring device 10, of the type described with reference to FIG. 2, receives the light coming from this optic system, which includes this source and this fiber and which can also include other elements. To shift the mirror $M_2$ associated with the output side of the source, the analyzing devices detect interferences depending on the coupling. If the axes x and y do not coincide with the axes X and Y of the fiber, the polarization coupling is high as is the contrast between the fringes. On the contrary, when the axes coincide, the polarization coupling is cancelled out as is the contrast between the fringes. By rotating the end of the fiber on its longitudinal axis in the output side of the source, it is possible to observe the changes in the resulting fringes and determine the best position of the fiber with respect to its longitudinal axis in the output side of the source. Then the bonding can be done.

Similarly, FIG. 5 illustrates the alignment of two polarization-preserving optic fibers by the same method: the SLD light source transmits light at the end of a first fiber $FO_1$ which should be connected to a second fiber $FO_2$. A measuring device 10, such as the one described above, receives the emergent radiation from the second fiber. For the position x of the mirror $M_2$, associated with the zone where the two fibers are linked at the abscissa z in the optical system, interference fringes are observed in the measuring device. If $X_1$ and $Y_1$ are the birefringence axes of the fiber $FO_2$, it is possible, by observing the variation in the contrast between the fringes when one fiber rotates on its longitudinal axis while the other is kept fixed, to determine the position in which there is coincidence between the axes $X_1$ and $X_2$ and $Y_1$ and $Y_2$ respectively. These two fibers are then bonded together in this position, the polarization coupling due to the connection being reduced to the minimum.

FIGS. 6 shows an example of a connection between an optical element on lithium niobate and an optic fiber. A SLD sources emits light radiation towards the input side of the optic separator S. One of the outputs of the separator should be connected to an optic fiber F.O., with polarization couplings being reduced to the minimum. For this, as earlier, the measuring device is placed at the output of the fiber to analyze the radiation coming from this fiber. For the position x of the fiber $M_2$, corresponding to the localizing of the connection, the observation of the fringes by the analyzing devices can be used to find the position of the fiber where the polarization coupling is reduced to the minimum. The method can be applied in the same way to the connection of a Y junction to an optic fiber.

This non-destructive measurement, which can be used for checks during assembly, can be adapted to any detection of localized polarization coupling as well as to systemic and virtual checks on an entire optical path in which it is desired to detect localized polarization couplings.

What is claimed is:

1. An apparatus for detecting and locating localized polarization couplings in a birefringent optical system comprising:
    a light source for entering polarized light into a birefringent optical system;
    a polarizer, placed in non-alignment with the birefringent axis of said optical system, for receiving light emerging from said optical system;
    an interferometer placed after said polarizer and for receiving the polarized light output of said polarizer, having two optical paths, with one of said paths having a variable length, and with a means for interference analysis of the optical system;
    means for varying the length of said variable optical path in response to the abscissa z of an analyzed point of the optical system;
    means in said interference analyzing means for analyzing fringes caused by the variation of the variable length optical path; and
    means for determining the contrast of said fringes, which is related to the level of coupling at the point of the abscissa z, being known from the difference in the lengths of the optical paths.

2. An apparatus according to claim 1 wherein the polarizer has its axis at 45° with respect to the birefringence axes of the optical system.

3. An apparatus according to claim 1 wherein a Michelson type interferometer is used in which one of the mirrors is movable along the optical axis in order to vary the length of an optical path, the movement $d=(x_1-x)$ of the mirror from the position where the two paths are equal being equal to half the difference between the paths of the primary and coupled wave trains respectively, in the birefringent optical system, between the coupling point and the polarizer.

4. An apparatus according to claim 9 further comprising:
    in the analyzing devices a means for detecting the contrast between the fringes so as to provide a signal indicative of the amplitude ratio between the primary wave train and the coupled wave train, resulting from the localized polarization coupling.

5. An apparatus according to claim 1, wherein:
    the components of a birefringent optical system are assembled such that the two components of a birefringent optical systems, and the relative orientation of the two elements are adjusted by reducing, to the minimum, the interferences created in the interferometer due to the difference in lengths of the optical paths associated with the position of the junction, such that the birefringence axes of the two elements are aligned.

6. An apparatus according to claim 5 wherein:
    the orientation of a polarization-preserving optic fiber with respect to the emitting side of a superluminescent diode.

7. An apparatus according to claim 5 wherein:
    there is a connection of two polarization-preserving optic fibers.

8. An apparatus according to claim 5 wherein:
    the components mounted in the birefringent optical system are oriented so as to reduce the polarization coupling to a minimum.

* * * * *